(12) United States Patent
Gleason-Chapell et al.

(10) Patent No.: US 12,179,916 B2
(45) Date of Patent: Dec. 31, 2024

(54) SHORTENING WINGSPAN OF AN AIRCRAFT

(71) Applicant: The Boeing Company, Chicago, IL (US)

(72) Inventors: Keily Madison Gleason-Chapell, Seattle, WA (US); Mark Steven Good, Seattle, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/073,414

(22) Filed: Dec. 1, 2022

(65) Prior Publication Data
US 2024/0182155 A1    Jun. 6, 2024

(51) Int. Cl.
*B64C 3/56* (2006.01)
(52) U.S. Cl.
CPC ...................... *B64C 3/56* (2013.01)
(58) Field of Classification Search
CPC ........... B64C 3/546; B64C 3/56; B64U 20/50; B64U 30/12; B64U 30/16
See application file for complete search history.

(56) References Cited

U.S. PATENT DOCUMENTS

| | | |
|---|---|---|
| 1,928,523 A | 9/1933 | Bally |
| 2,402,733 A * | 6/1946 | Cooley .................... B64C 3/54 244/218 |
| 3,138,354 A | 6/1964 | Baetke |
| 3,421,718 A | 1/1969 | Gehringer et al. |
| 8,708,286 B2 | 4/2014 | Sakurai et al. |
| 9,889,920 B2 | 2/2018 | Harding et al. |
| 9,950,780 B2 | 4/2018 | Santini |
| 10,583,909 B2 | 3/2020 | Alexander |
| 11,492,102 B2 | 11/2022 | Xi |
| 11,780,554 B2 | 10/2023 | Everaert et al. |
| 2013/0056579 A1 | 3/2013 | Schlipf et al. |

(Continued)

FOREIGN PATENT DOCUMENTS

CN    115009507 A   *  9/2022
CN    113665790 B       3/2023

OTHER PUBLICATIONS

United States Patent and Trademark Office, Office Action Issued in U.S. Appl. No. 18/073,403, filed Apr. 4, 2024, 19 pages.

(Continued)

*Primary Examiner* — Brady W Frazier
*Assistant Examiner* — Peter A Taraschi
(74) *Attorney, Agent, or Firm* — Alleman Hall & Tuttle LLP

(57) ABSTRACT

An apparatus for shortening a wingspan of an aircraft is disclosed. The apparatus comprises a first bracket and a second bracket extending from a wingtip of the aircraft, and a motor coupled to a fixed wing of the aircraft. A first outboard link is rotatably coupled to the first bracket and to the motor, and a second outboard link is rotatably coupled to the second bracket and to the motor. A first inboard link is rotatably coupled to the first bracket and to the fixed wing, and a second inboard link is rotatably coupled to the second bracket and to the fixed wing. The motor is configured to rotate the first outboard link and the second outboard link to move the wingtip between an extended position and a stowed position.

20 Claims, 19 Drawing Sheets

(56) References Cited

U.S. PATENT DOCUMENTS

| | | | |
|---|---|---|---|
| 2016/0167092 A1* | 6/2016 | Gaw | B64C 3/56 15/1.51 |
| 2016/0251075 A1 | 9/2016 | Thompson et al. | |
| 2017/0137110 A1 | 5/2017 | Harding et al. | |
| 2017/0137111 A1 | 5/2017 | Harding et al. | |
| 2019/0337605 A1* | 11/2019 | Lorenz | B64C 1/30 |
| 2020/0079491 A1* | 3/2020 | Gruner | B64D 45/00 |
| 2023/0129220 A1 | 4/2023 | Edwards | |

OTHER PUBLICATIONS

Office Action issued in U.S. Appl. No. 18/191,761, Mailing Date Jun. 21, 2024, 17 pages.

* cited by examiner

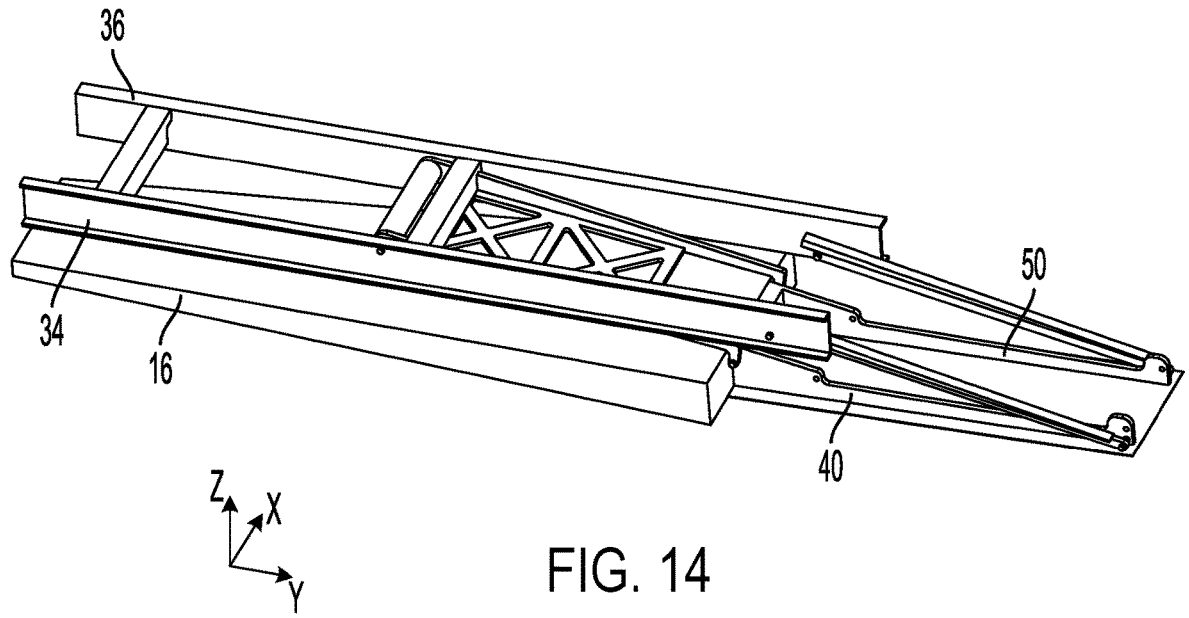
FIG. 14
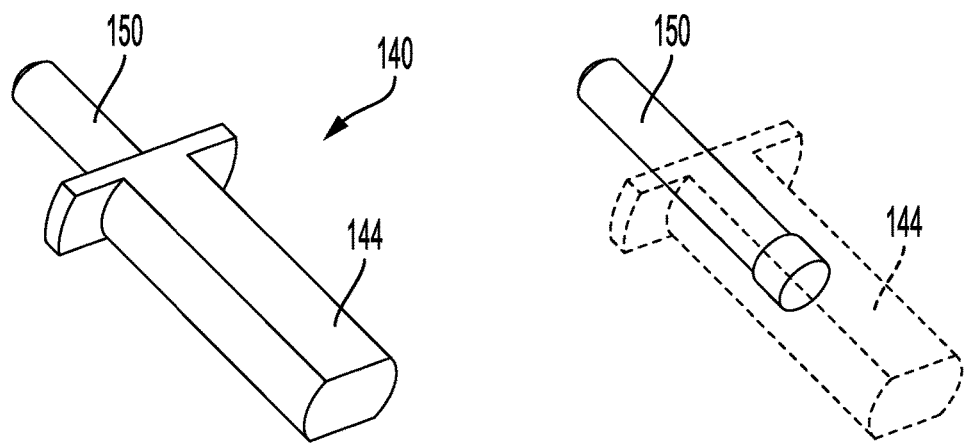
FIG. 15
FIG. 16

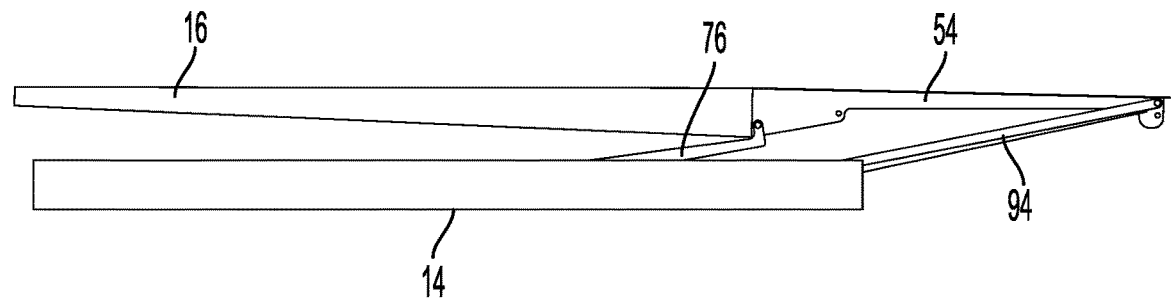
FIG. 24
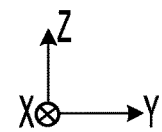
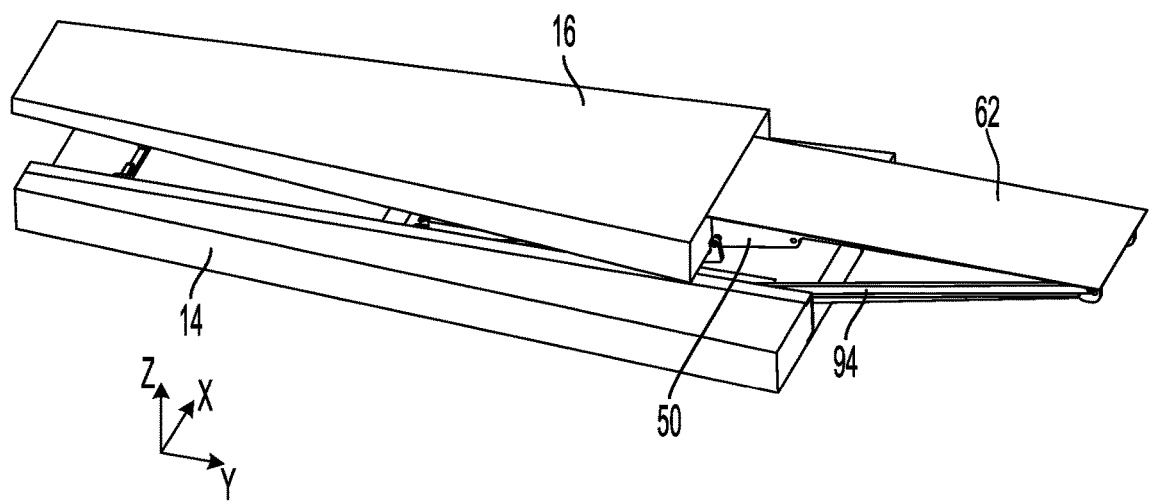
FIG. 25

200

204 — PROVIDING AN APPARATUS FOR MOVING A WINGTIP UNDER A FIXED WING OF THE AIRCRAFT, THE APPARATUS COMPRISING: A FIRST BRACKET AND A SECOND BRACKET EXTENDING FROM THE WINGTIP OF THE AIRCRAFT; A MOTOR COUPLED TO THE FIXED WING OF THE AIRCRAFT; A FIRST OUTBOARD LINK ROTATABLY COUPLED TO THE FIRST BRACKET AND TO THE MOTOR; A SECOND OUTBOARD LINK ROTATABLY COUPLED TO THE SECOND BRACKET AND TO THE MOTOR; A FIRST INBOARD LINK ROATATBLY COUPLED TO THE FIRST BRACKET AND TO THE FIXED WING; AND A SECOND INBOARD LINK ROTATABLY COUPLED TO THE SECOND BARCKET AND TO THE FIXED WING

208 — POSITIONING THE WINGTIP AT AN OUTBOARD END OF THE FIXED WING

212 — MOVING THE WINGTIP UNDER THE FIXED WING BY ROTATING THE FIRST OUTBOARD LINK AND THE SECOND OUTBOARD LINK ABOUT A MOTOR AXIS

FIG. 26

SHORTENING WINGSPAN OF AN AIRCRAFT

FIELD

The present disclosure relates generally to the field of aircraft, and more specifically to shortening the wingspan of an aircraft by moving a wingtip between an extended position and a stowed position.

BACKGROUND

In some examples, the wingspan of an aircraft can inhibit the free movement of the aircraft, such as preventing the aircraft from entering a hangar having a limited-width entryway. To address this issue, some aircraft utilize upwardly-folding wingtips that can temporarily reduce the aircraft's wingspan. As described in more detail below, the configurations described herein provide improved apparatuses for shortening an aircraft's wingspan.

SUMMARY

According to one aspect of the present disclosure, an apparatus for shortening a wingspan of an aircraft is disclosed. The apparatus includes a first bracket and a second bracket extending from a wingtip of the aircraft, and a motor coupled to a fixed wing of the aircraft. A first outboard link is rotatably coupled to the first bracket and to the motor, and a second outboard is link rotatably coupled to the second bracket and to the motor. A first inboard link is rotatably coupled to the first bracket and to the fixed wing, and a second inboard link is rotatably coupled to the second bracket and to the fixed wing. The motor is configured to rotate the first outboard link and the second outboard link to move the wingtip between an extended position and a stowed position under the fixed wing.

In another aspect, an aircraft comprises a fixed wing extending from a fuselage, a wingtip moveably coupled to an outboard end of the fixed wing, and an apparatus configured to move the wingtip under the fixed wing. The apparatus comprises a first bracket and a second bracket extending from the wingtip of the aircraft, and a motor coupled to the fixed wing of the aircraft. A first outboard link is rotatably coupled to the first bracket and to the motor, and a second outboard is link rotatably coupled to the second bracket and to the motor. A first inboard link is rotatably coupled to the first bracket and to the fixed wing, and a second inboard link is rotatably coupled to the second bracket and to the fixed wing. The motor is configured to rotate the first outboard link and the second outboard link to move the wingtip between an extended position and a stowed position.

In another aspect, a method of shortening a wingspan of an aircraft is provided. The method comprises providing an apparatus configured to move a wingtip under a fixed wing of the aircraft. The apparatus comprises a first bracket and a second bracket extending from the wingtip of the aircraft, and a motor coupled to the fixed wing of the aircraft. A first outboard link is rotatably coupled to the first bracket and to the motor, and a second outboard is link rotatably coupled to the second bracket and to the motor. A first inboard link is rotatably coupled to the first bracket and to the fixed wing, and a second inboard link is rotatably coupled to the second bracket and to the fixed wing. The motor is configured to rotate the first outboard link and the second outboard link to move the wingtip between an extended position and a stowed position under the fixed wing.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

FIG. 14 shows the wingtip in the stowed position under the fixed wing with the skins of the fixed wing removed.

FIGS. 15 and 16 show a latch pin assembly

FIG. 24 is a side view of this embodiment showing the wingtip stowed above the fixed wing.

FIG. 25 is another view showing the wingtip in the stowed position above the fixed wing.

FIG. 26 is a flowchart of an exemplary embodiment of a method of shortening a wingspan of an aircraft.

DETAILED DESCRIPTION

As noted above, in some examples the wingspan of an aircraft can inhibit its free movement into areas having dimensional restrictions. The configurations described herein provide improved apparatus for selectively shortening an aircraft's wingspan by moving a wingtip between an extended position and a stowed position. As described in more detail below, configurations of the present disclosure include components for safely moving and temporarily storing a wingtip either under or above a fixed wing of an aircraft, as well as securing the wingtip in an extended position for flight.

Figure 1:
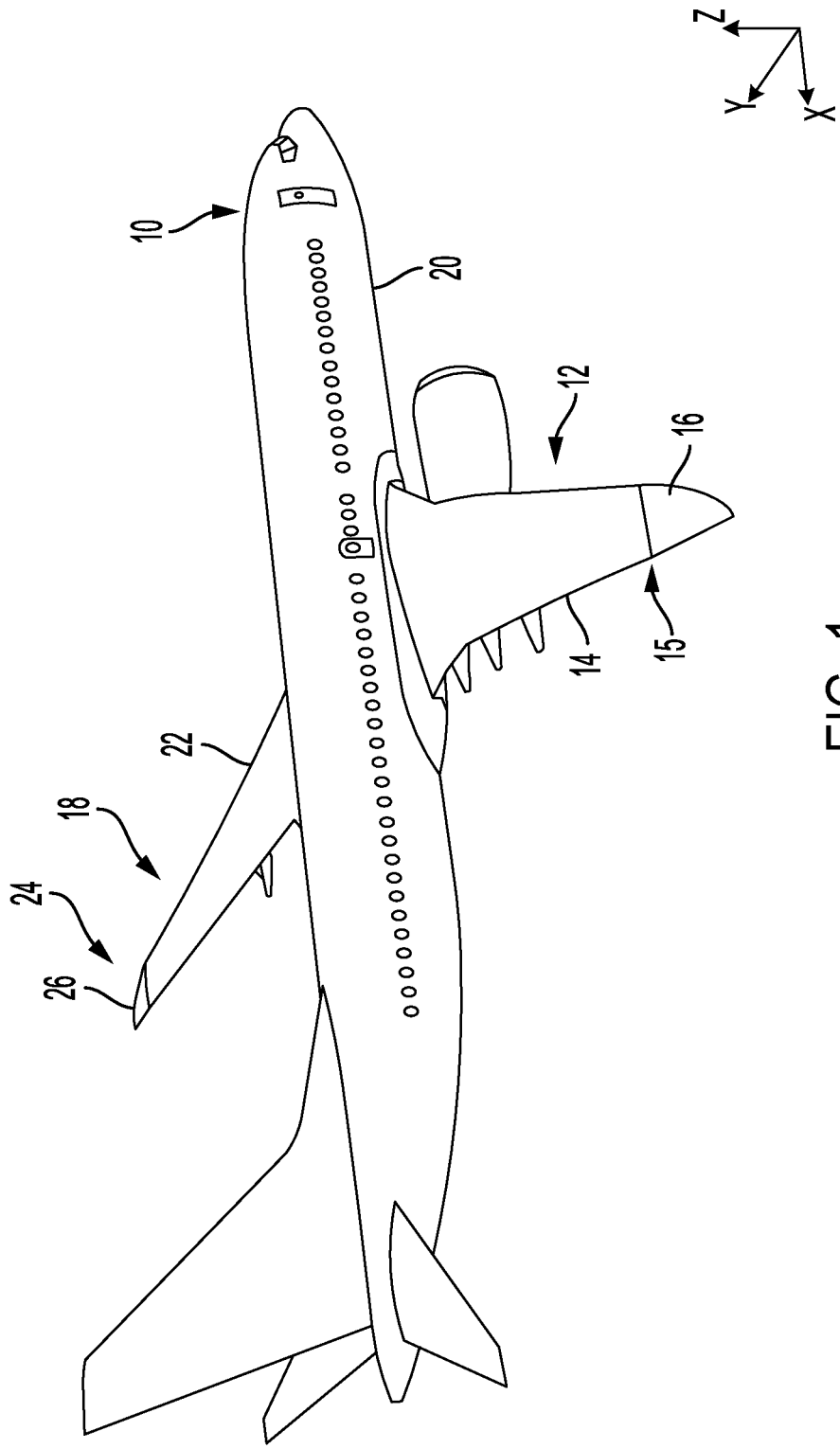
FIG. 1 is a representation of an exemplary embodiment of an aircraft configured to move its wingtips under fixed wings.
Figure 2:
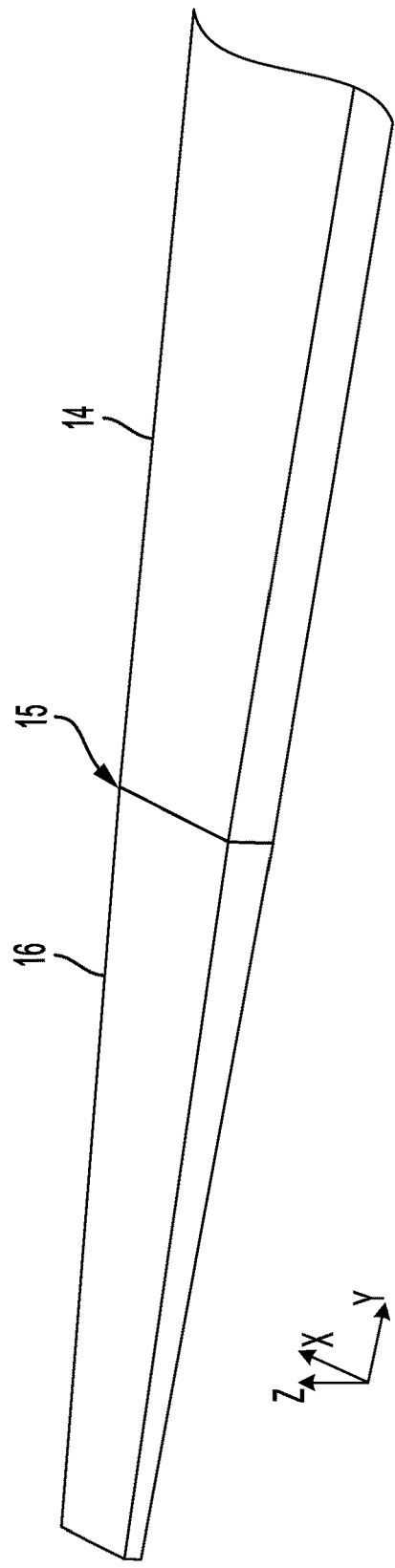
FIG. 2 shows a portion of the starboard wing of the aircraft of FIG. 1 with the wingtip in the extended position.

FIG. 1 is a diagrammatic representation of an exemplary embodiment of an aircraft 10 according to examples of the present disclosure. In other examples, the configurations and components of the present disclosure can be used with a wide variety of other aircraft having different form factors, sizes, and/or flight capabilities. The aircraft 10 comprises a fuselage 20, a starboard wing 12 and a port wing 18. In various examples, components of the aircraft 10 may be fabricated from metal, composite materials, polymeric materials, ceramic materials, and/or combinations thereof.

The fuselage 20 comprises an interior cabin that is configured to accommodate a payload, such as passengers and cargo. The starboard wing 12 and port wing 18 are coupled to the fuselage 20 and extend laterally from the fuselage. The starboard wing 12 comprises a starboard fixed wing 14 and a starboard wingtip 16. Similarly, the port wing 18 comprises a port fixed wing 22 and a port wingtip 26. As described in more detail below, the starboard wingtip 16 and the port wingtip 26 are coupled to their corresponding fixed wings in a manner that enables the wingtips to be moved from an extended position shown in FIG. 1 to a stowed position under their corresponding fixed wing (see FIG. 12).

Figure 11:
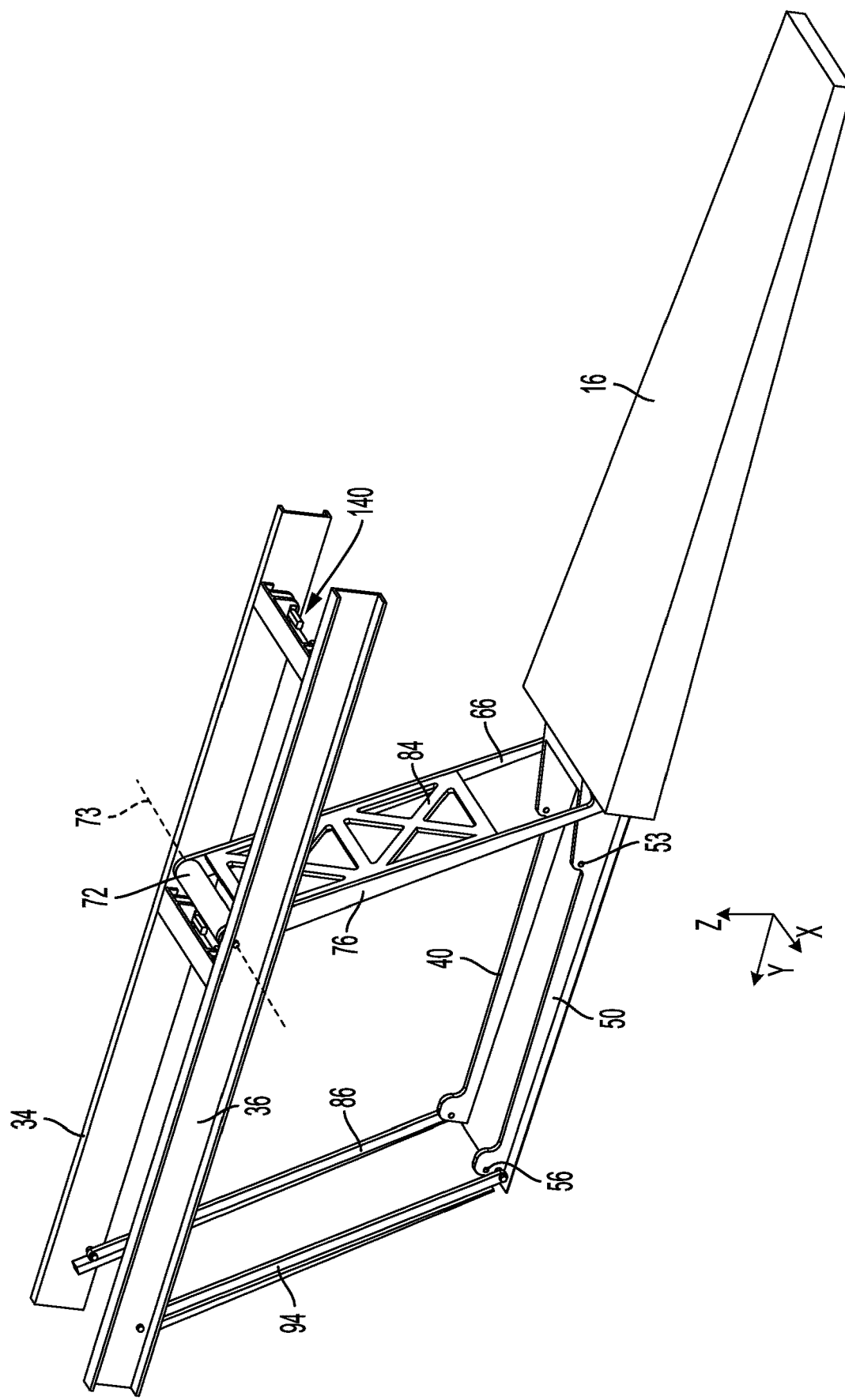
FIG. 11 is another partial view of the wingtip in the middle position.
Figure 12:
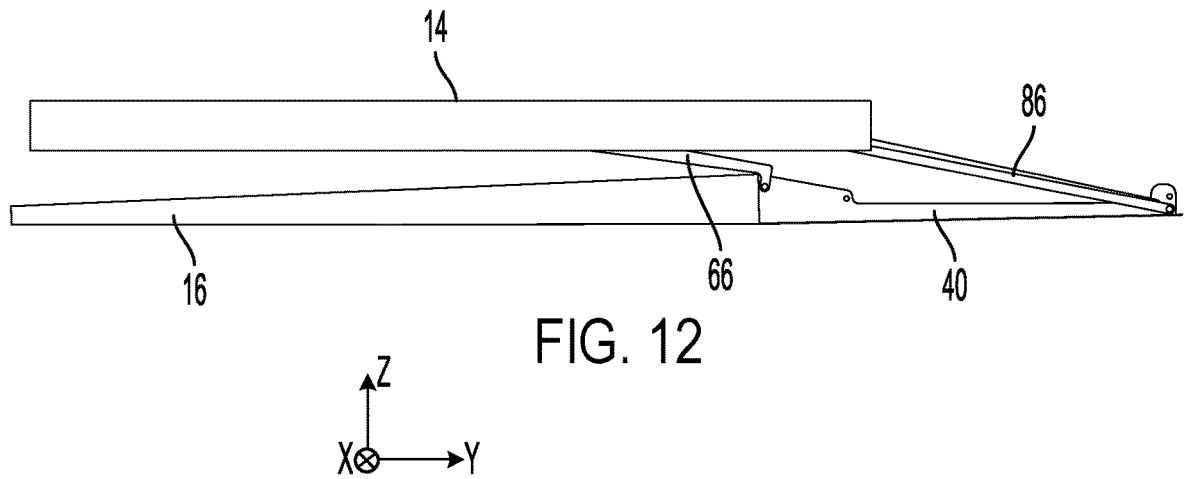
FIG. 12 is a partial side view showing the wingtip in a stowed position under the fixed wing.
Figure 13:
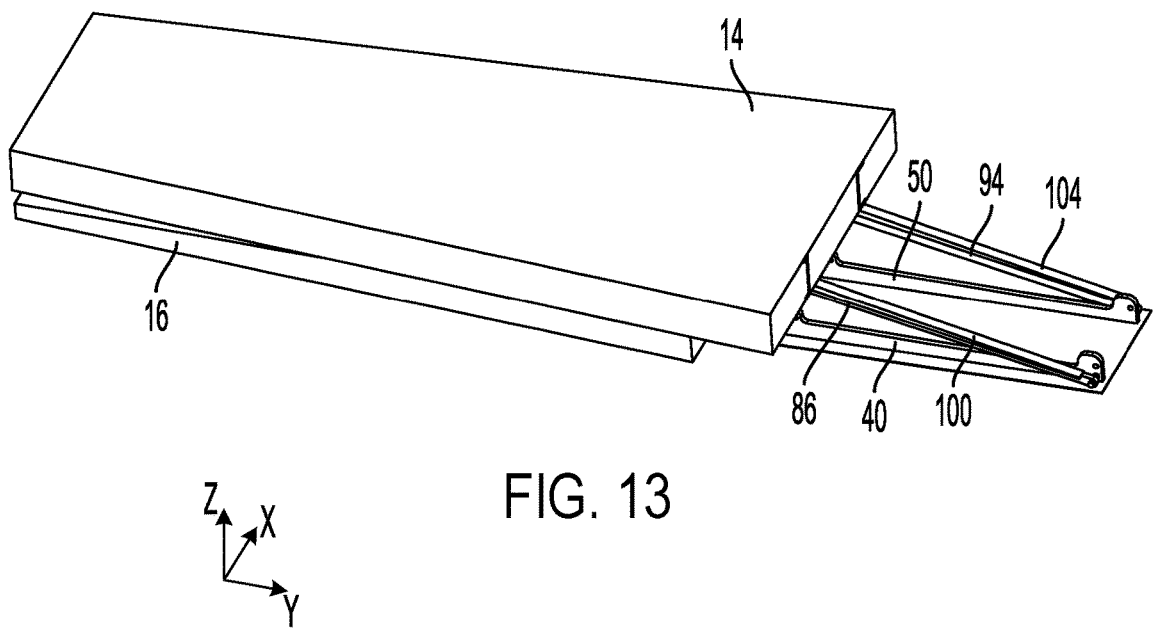
FIG. 13 is another partial view showing the wingtip in the stowed position under the fixed wing.

FIGS. 2-7 show different views of portions of the starboard fixed wing 14 and the starboard wingtip 16 in the extended position, along with components of an apparatus 30 for moving the wingtip from the extended position to a stowed position under the fixed wing. FIGS. 8-11 show different views of portions of the starboard wingtip 16 in a middle position between the extended position and a stowed position under the starboard fixed wing 14. FIGS. 12-14 show different views of the starboard wingtip 16 in a stowed position under the starboard fixed wing 14. FIGS. 15-22 show latch pin assemblies that can be used to lock the wingtip in the extended position. The following descriptions of the starboard fixed wing 14, starboard wingtip 16, and the apparatus 30 configured to move the wingtip under the fixed wing apply equally to the port fixed wing 22 and port wingtip 26. In other examples and as shown in FIGS. 23-25, the apparatus 30 is configured to move the wingtip from the extended position to a stowed position above the fixed wing.

Figure 4:
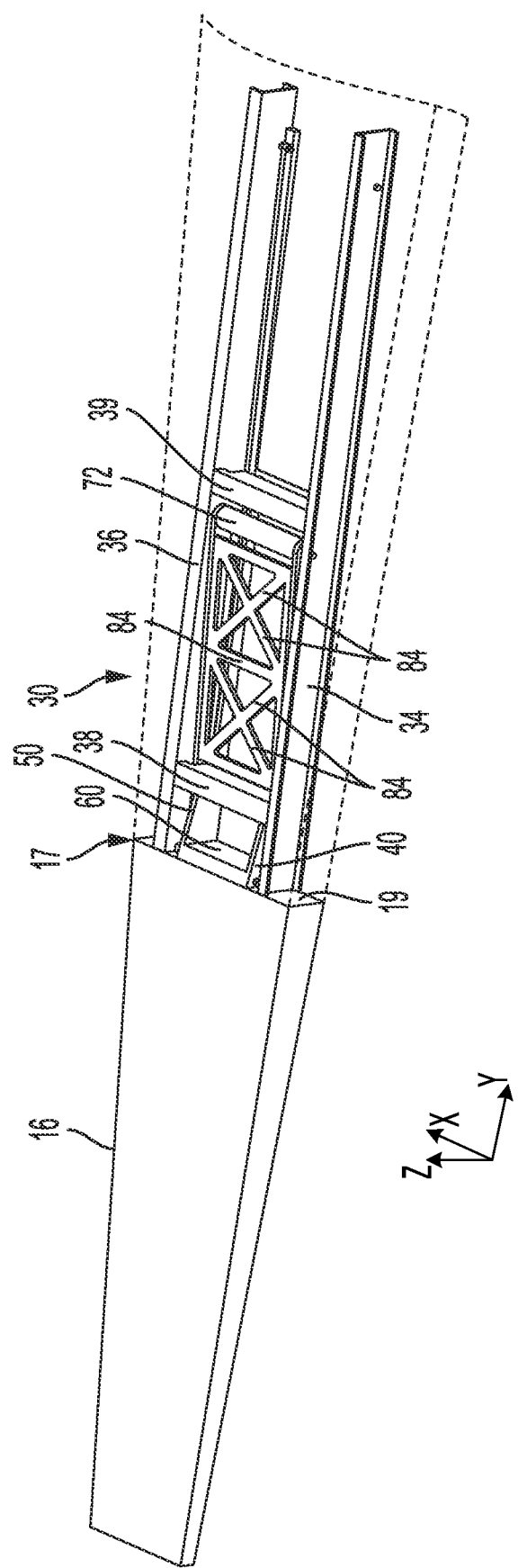
FIG. 4 shows the starboard wing of FIG. 2 with the fixed wing skins removed to reveal components of an apparatus configured to move the wingtip under the fixed wing according to one embodiment of the present disclosure.

With reference now to FIG. 4, the starboard fixed wing 14 includes a first spar 34 and second spar 36 that extend from the fuselage 20 (not shown). As described in more detail below, the first spar 34 and second spar 36 provide structural support for components of the apparatus 30 that moves the starboard wingtip 16 under the starboard fixed wing 14. An outboard rib 38 and an inboard rib 39 extend between the first spar 34 and second spar 36 to provide structural integrity to the starboard fixed wing 14.

Figure 5:
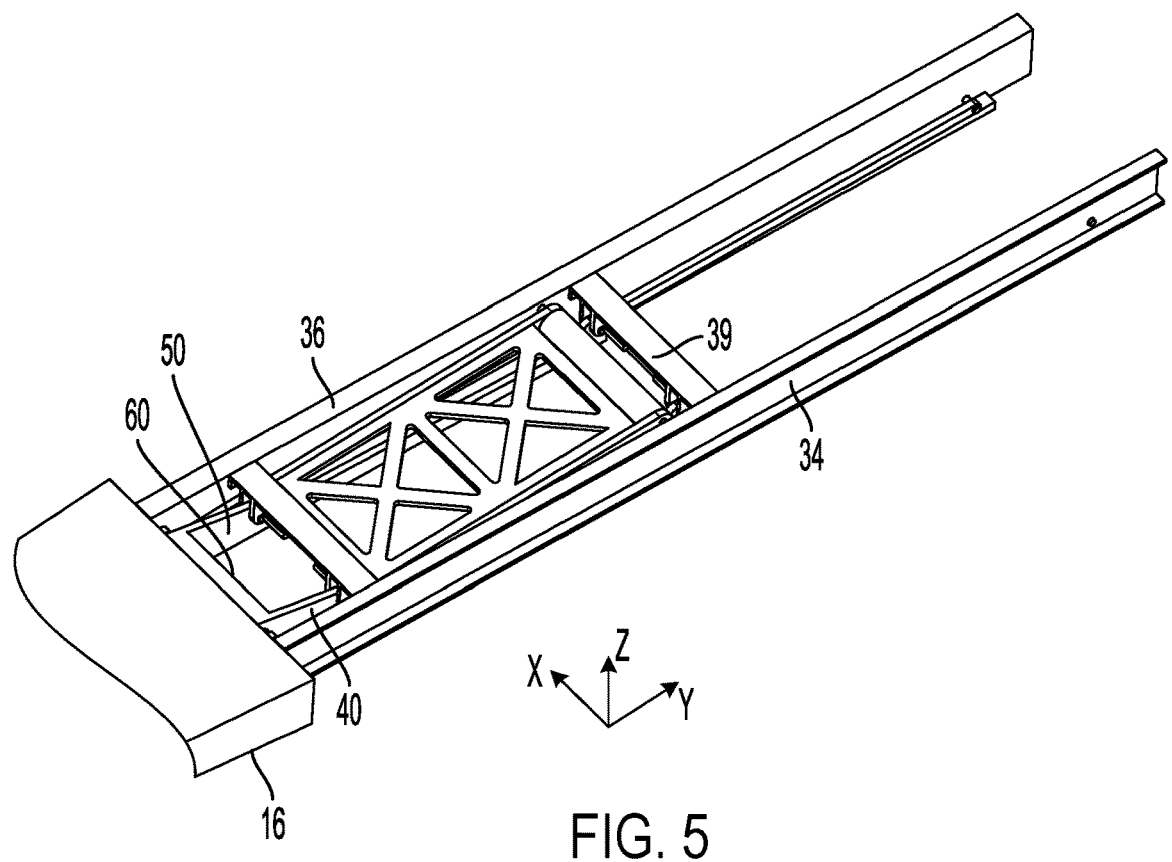
FIG. 5 is a more detailed view of the fixed wing of FIG. 4.
Figure 8:
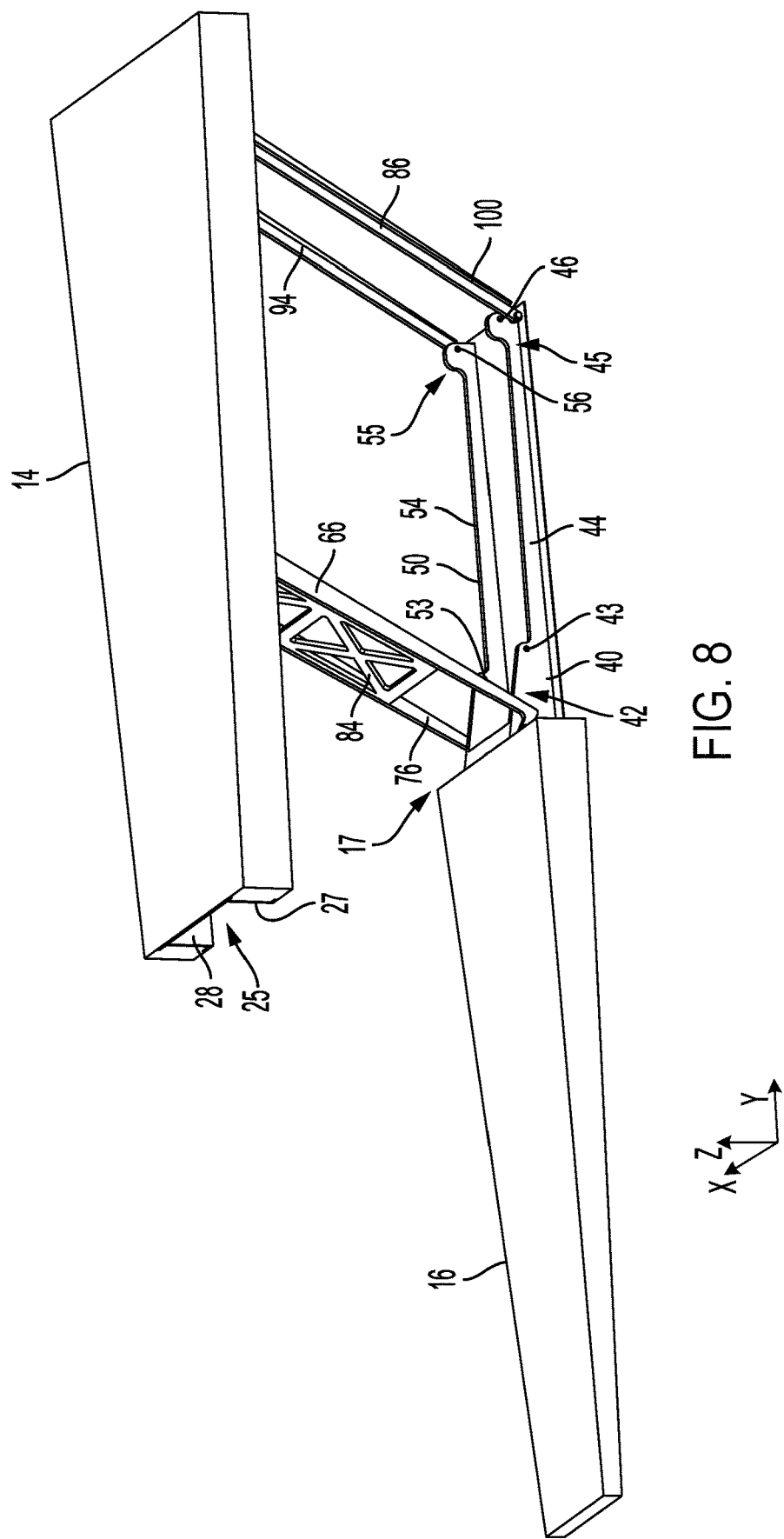
FIG. 8 is a partial view showing the wingtip in a middle position between the extended position and a stowed position under the fixed wing.

With reference also to FIGS. 5, 8, and 12, and as described in more detail below, the apparatus 30 comprises a four-bar linkage that enables the starboard wingtip 16 to move between the extended position of FIG. 5 to the stowed position of FIG. 12, and vice versa. The apparatus 30 includes a first bracket 40 and a second bracket 50 that extend from an inboard end 17 of the starboard wingtip 16.

With reference to FIGS. 4 and 5, the first bracket 40 and second bracket 50 are connected to one another via connecting member 60. In some examples, the first bracket 40, second bracket 50, and connecting member 60 may be fabricated as a single component, such as via additive manufacturing techniques. In other examples, the first bracket 40, second bracket 50, and connecting member 60 are separate components that are joined or bonded together. In this example, the connecting member 60 is affixed to an inboard surface 19 of the starboard wingtip 16 via welding or any other suitable fastening method.

Figure 6:
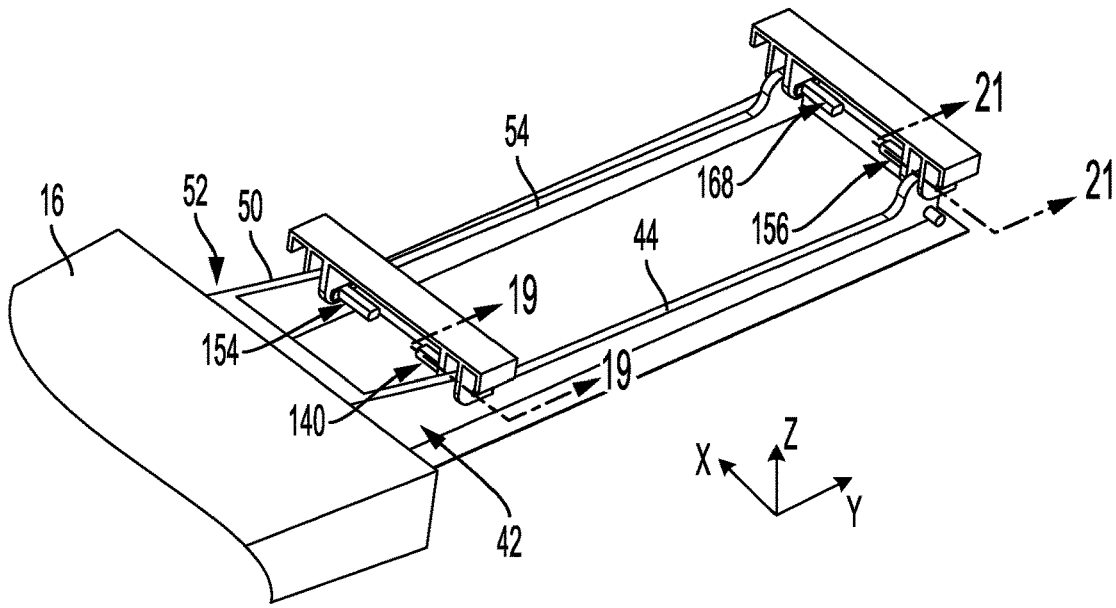
FIG. 6 is a partial view showing two brackets and two ribs of the fixed wing of FIG. 5.
Figure 9:
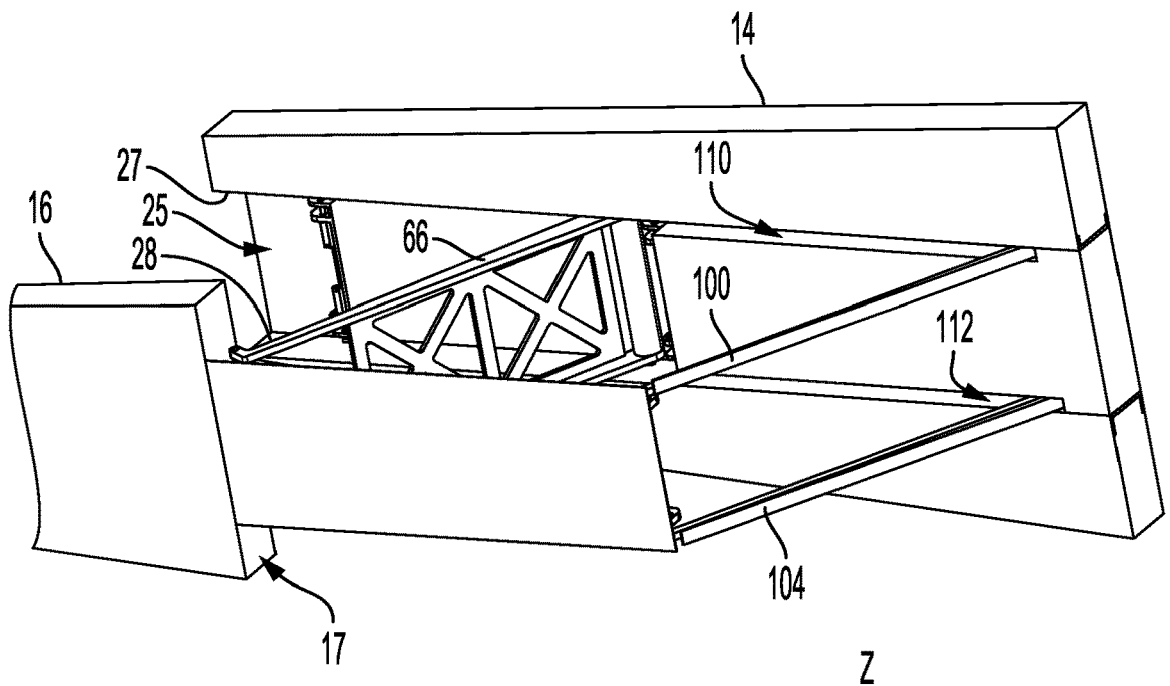
FIG. 9 is another partial view showing the wingtip in the middle position.
Figure 10:
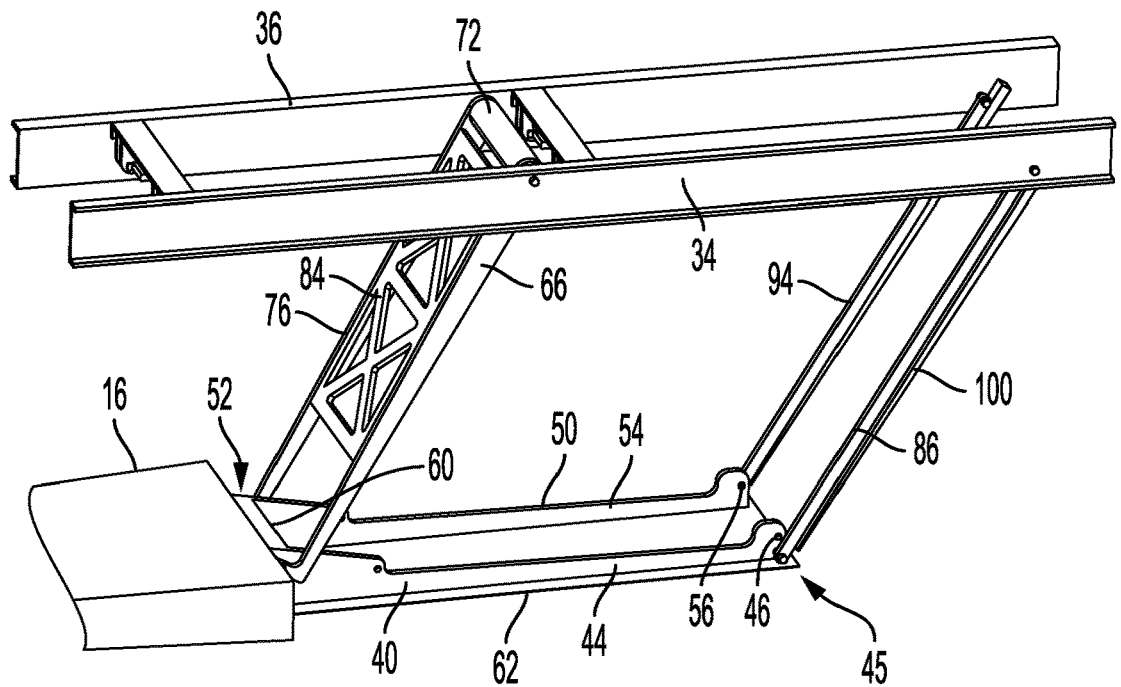
FIG. 10 is another partial view of the wingtip in the middle position.

With reference to FIGS. 6, 8, and 10, the first bracket 40 includes an attachment end 42 and a first elongated arm 44 extending from the attachment end toward the fuselage 20 of the aircraft 10. A first outboard link 66 is rotatably coupled to the first bracket 40 and to a motor 72. With reference to FIGS. 9-11, the motor 72 is coupled to the starboard fixed wing 14 via the first spar 34 and the second spar 36. At the opposing end of the first bracket 40, a first inboard link 86 is rotatably coupled to the inboard end 45 of the first arm 44 of the first bracket 40 and to the first spar 34.

Similarly, the second bracket 50 includes an attachment end 52 and a second elongated arm 54 extending from the attachment end toward the fuselage 20 of the aircraft 10. A second outboard link 76 is rotatably coupled to the second bracket 50 and to the motor 72. At the opposing end of the second bracket 50, a second inboard link 94 is rotatably coupled to the second bracket 50 and to the second spar 36. In this manner, with reference also to FIG. 11 and in one potential advantage of the present disclosure, the motor 72 is configured to rotate the first outboard link 66 and the second outboard link 76 about a motor axis 73 of the motor 72 to move the starboard wingtip 16 between the extended position and the stowed position under the starboard fixed wing 14. Additionally, by utilizing this four-bar linkage, the first outboard link 66, the second outboard link 76, the first inboard link 86, and the second inboard link 94 remain parallel to one another as the starboard wingtip 16 moves between the extended position and the stowed position under the starboard fixed wing 14, thereby providing a stable mechanism for transitioning the position of the wingtip. In other examples, the first and second outboard links 66, 76 have different lengths than the first and second inboard links 86, 94. In these examples, the first and second outboard links 66, 76 do not remain parallel to the first and second inboard links 86, 94 as the starboard wingtip 16 moves between the extended position and the stowed position under the starboard fixed wing 14. Accordingly, in these examples when the wingtip 16 is in the stowed position, the wingtip forms an angle with the fixed wing 14 that corresponds to the difference in lengths between the first and second outboard links 66, 76 and the first and second inboard links 86, 94.

In this example, a plurality of stiffener members 84 extend between the first outboard link 66 and the second outboard link 76. Advantageously, the stiffener members 84 provide structural integrity to the first and second outboard links 66, 76, thereby providing additional lateral stability to the apparatus 30.

Figure 3:
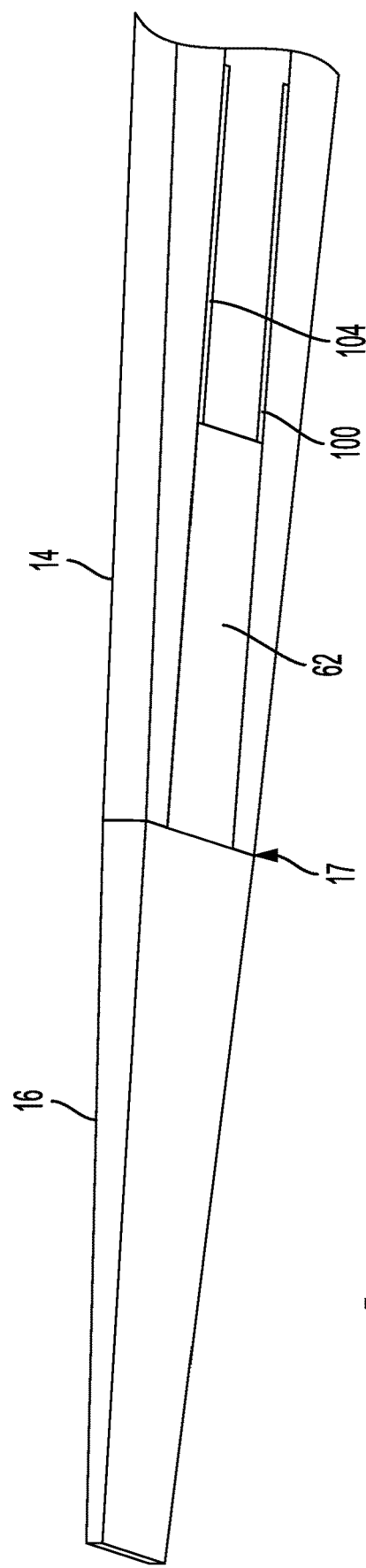
FIG. 3 shows a bottom view of the starboard wing of FIG. 2.

With reference to FIGS. 8 and 9, the starboard fixed wing 14 includes a cavity 25 that is defined in part by a first inner sidewall 27 and an opposing second inner sidewall 28 of the starboard fixed wing. With reference also to FIGS. 3 and 4, and in another potential advantage of the present configuration, when the starboard wingtip 16 is in the extended position, the first bracket 40, second bracket 50, first outboard link 66, and second outboard link 76 are received within the cavity 25 to remove these components from the aerodynamic profile of the starboard wing 12.

Figure 7:
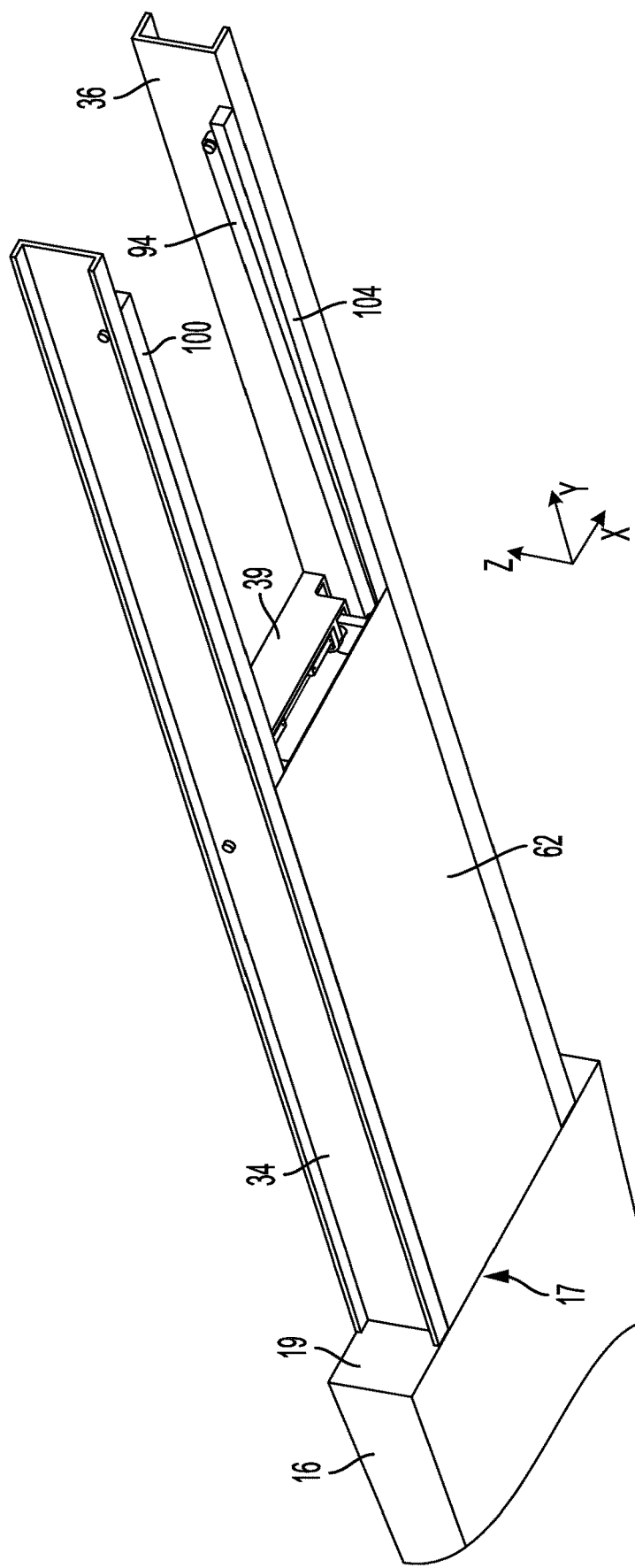
FIG. 7 is a partial bottom view of the fixed wing of FIG. 4.

Additionally, with reference to FIGS. 3 and 7, a flexible panel 62 extends from the inboard surface 19 at the inboard end 17 of the starboard wingtip 16 toward the fuselage 20 of the aircraft 10. In this example and with reference also to FIG. 8, the first bracket 40 and the second bracket 50 are affixed to the flexible panel 62. Advantageously, when the starboard wingtip 16 is in the extended position, in this configuration the flexible panel 62 covers the cavity 25 and underlying components of the apparatus 30, thereby providing a smooth aerodynamic profile of the starboard wing 12.

With reference now to FIGS. 6 and 15-20, the apparatus 30 includes a first outboard latch pin assembly 140 affixed to the outboard rib 38 and configured to extend a latch pin 150 through a first outboard aperture 43 defined in the attachment end 42 of the first bracket 40 (see FIGS. 8 and 19) to releasably lock the starboard wingtip 16 in the extended position. In one potential advantage of the present disclosure, this feature along with the other latch pin assemblies described below ensure the starboard wingtip 16 remains securely oriented in the extended position when the aircraft is in flight.

Figure 19:
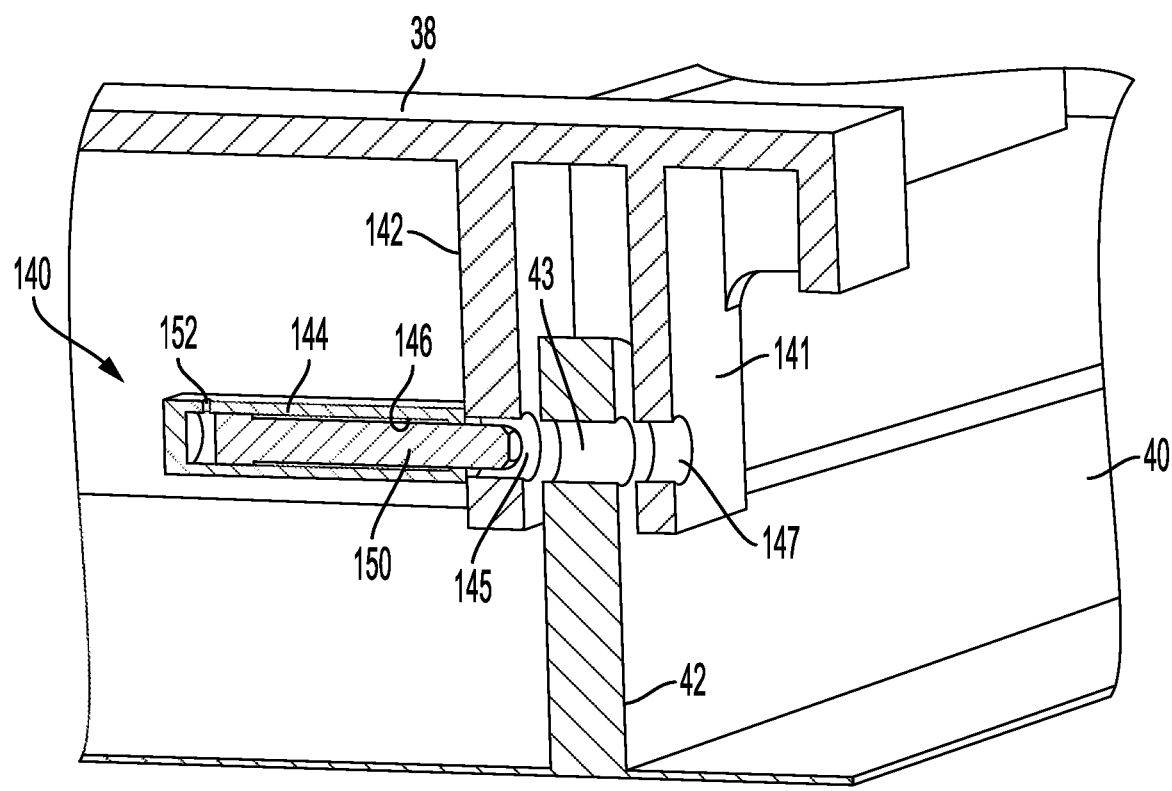
FIG. 19 is a cross-section view taken along line 19-19 in FIG. 6 showing a first outboard latch pin assembly with a latch pin in a retracted position.
Figure 20:
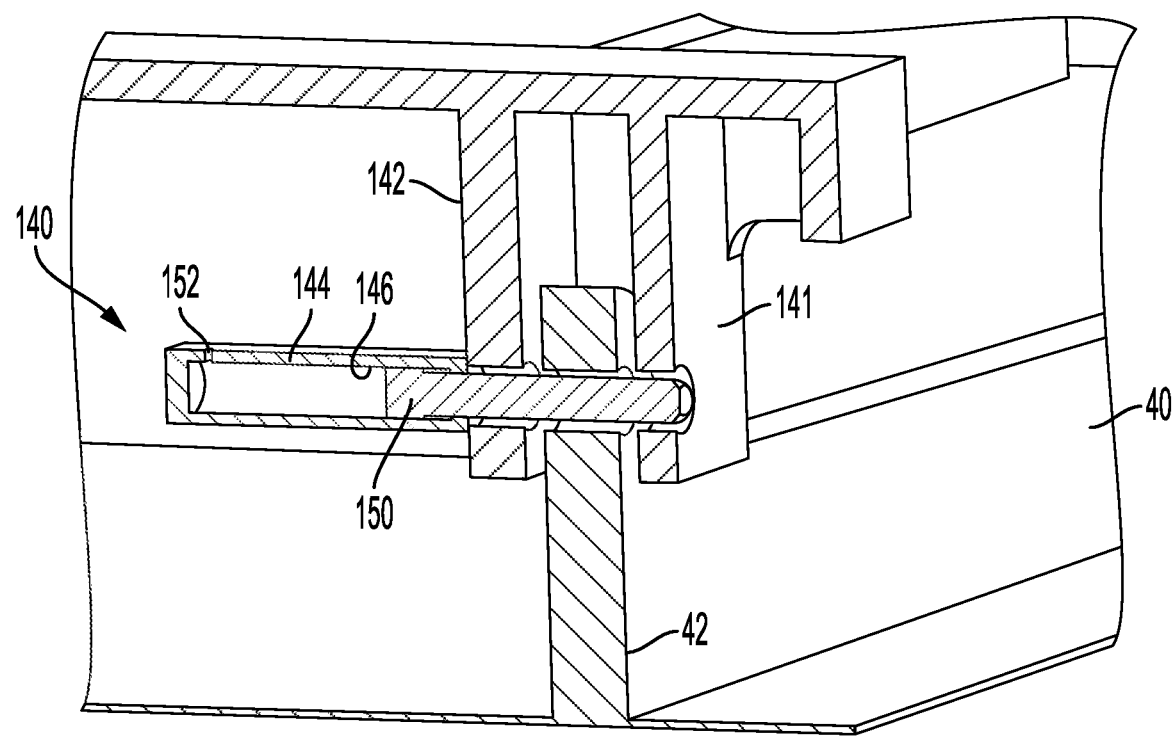
FIG. 20 shows the first outboard latch pin assembly with the latch pin in an extended position.

With reference to FIGS. 19 and 20, when the starboard wingtip 16 is in the extended position, an upper portion of the attachment end 42 of first bracket 40 extends between a first projecting member 141 and a second projecting member 142 of the outboard rib 38. In this configuration, the latch pin 150 is configured to move through a second member aperture 145 of the second projecting member 142, the first outboard aperture 43 of the first bracket 40, and a first member aperture 147 of the first projecting member 141. With reference also to FIGS. 15 and 16, a housing 144 of the first outboard latch pin assembly 140 includes a bore 146 (see FIGS. 19, 20) in which the latch pin 150 is moveably retained. As shown in FIG. 19, an intake/exhaust port 152 defined in the housing 144 is fluidically coupled to a pressurized fluid source (not shown) to selectively extend and retract the latch pin 150. In other examples, the latch pin 150 can be actuated by other types of power sources, such as a solenoid or leadscrew. FIG. 20 shows the latch pin 150 in the actuated position that locks the first bracket 40 and attached starboard wingtip 16 in the extended position via the outboard rib 38. In other examples, a variety of other mechanisms, including but not limited to hook mechanisms, can be used to lock the starboard wingtip 16 in the extended position.

Figure 17:
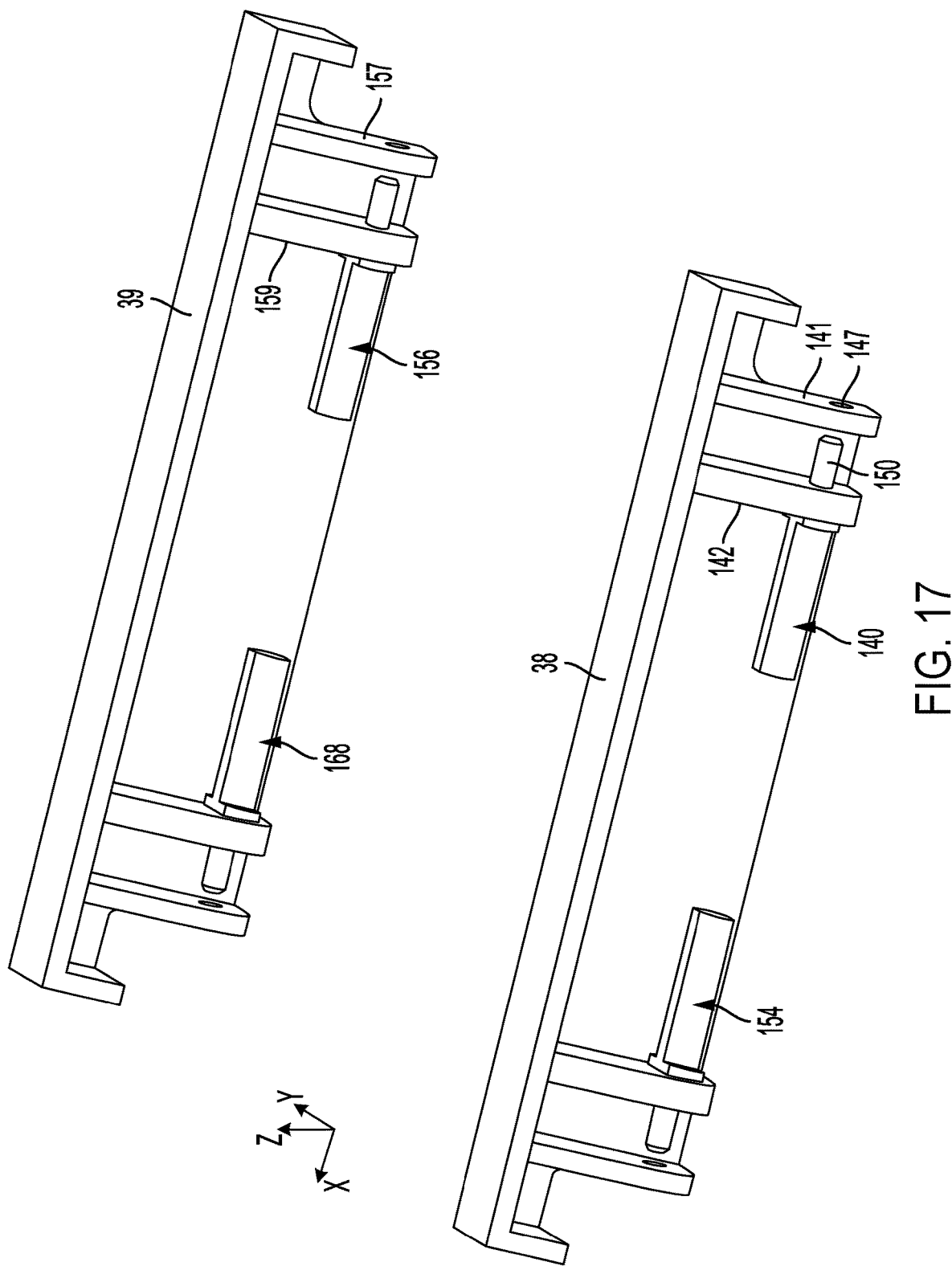
FIG. 17 shows latch pin assemblies mounted to the two ribs of the fixed wing of FIG. 4.
Figure 18:
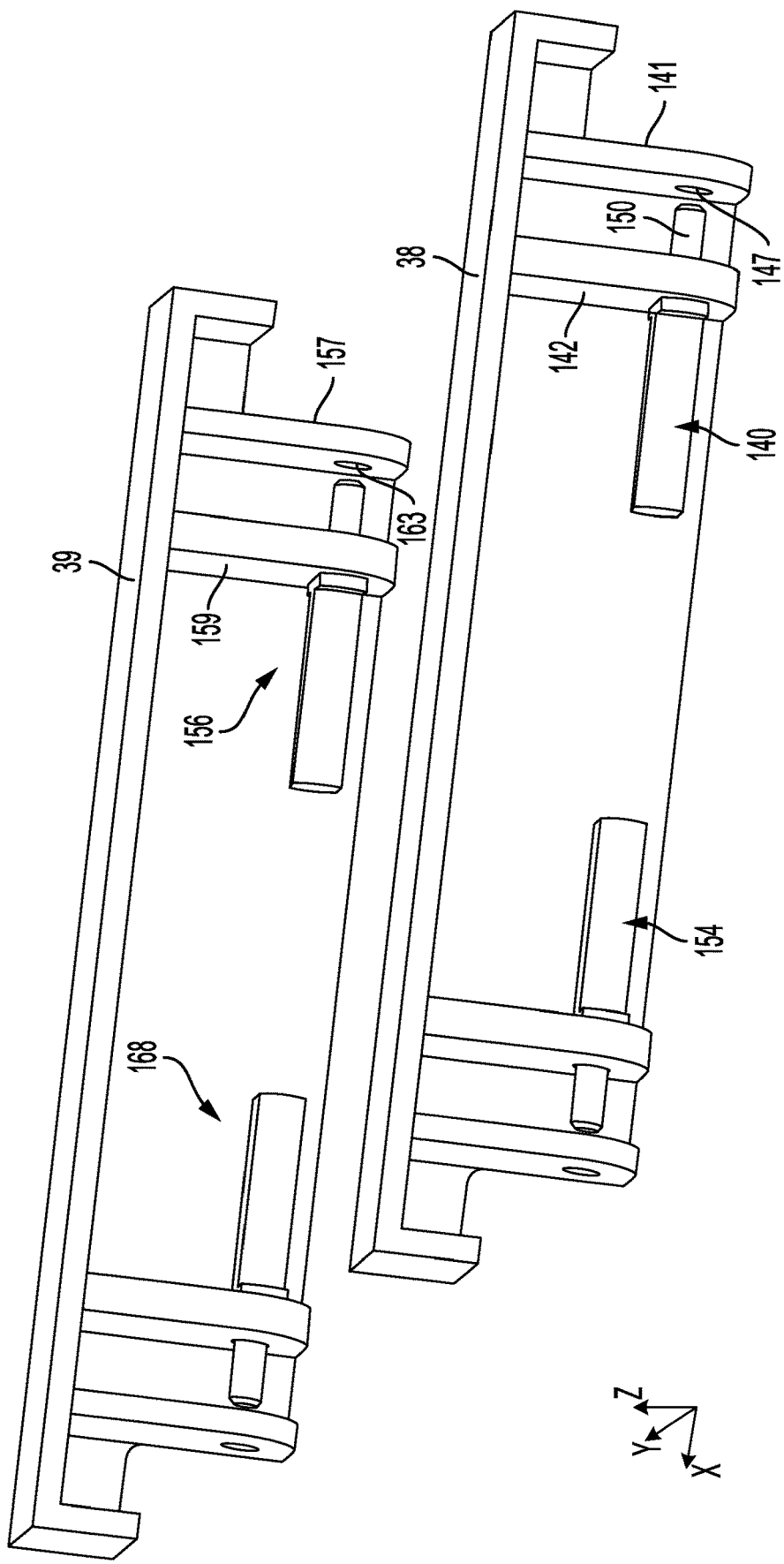
FIG. 18 shows another view of the latch pin assemblies of FIG. 17.

With reference now to FIGS. 6, 17, and 18, the apparatus 30 also includes a second outboard latch pin assembly 154 that is similarly configured to extend a latch pin through a second outboard aperture 53 (see FIGS. 8 and 11) defined in an attachment end of the second bracket 50 to lock the starboard wingtip 16 in the extended position.

Figure 21:
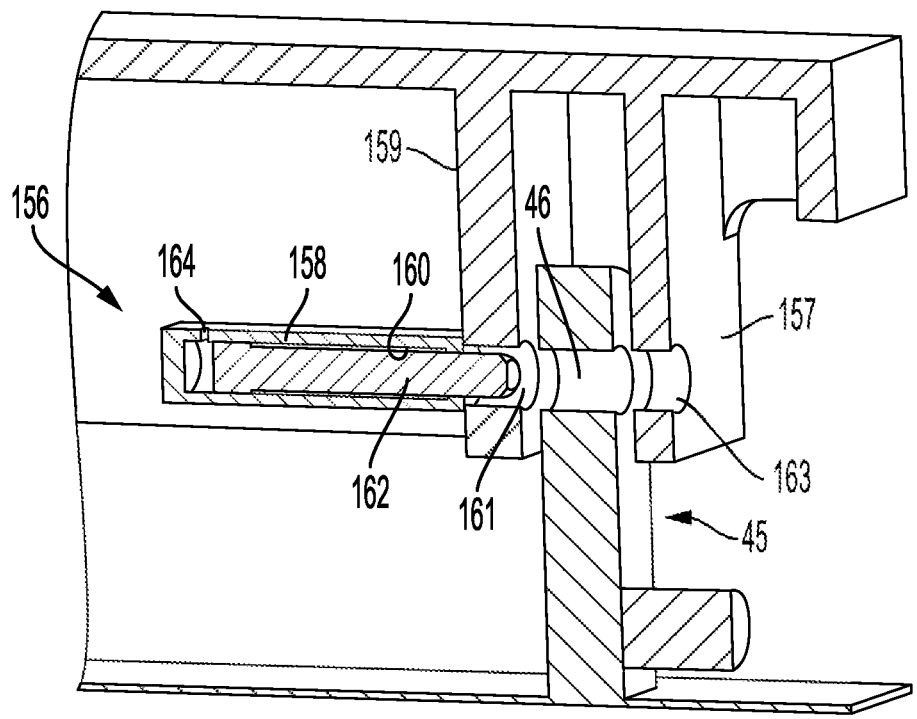
FIG. 21 is a cross-section view taken along line 21-21 in FIG. 6 showing a first inboard latch pin assembly with a first inboard latch pin in a retracted position.
Figure 22:
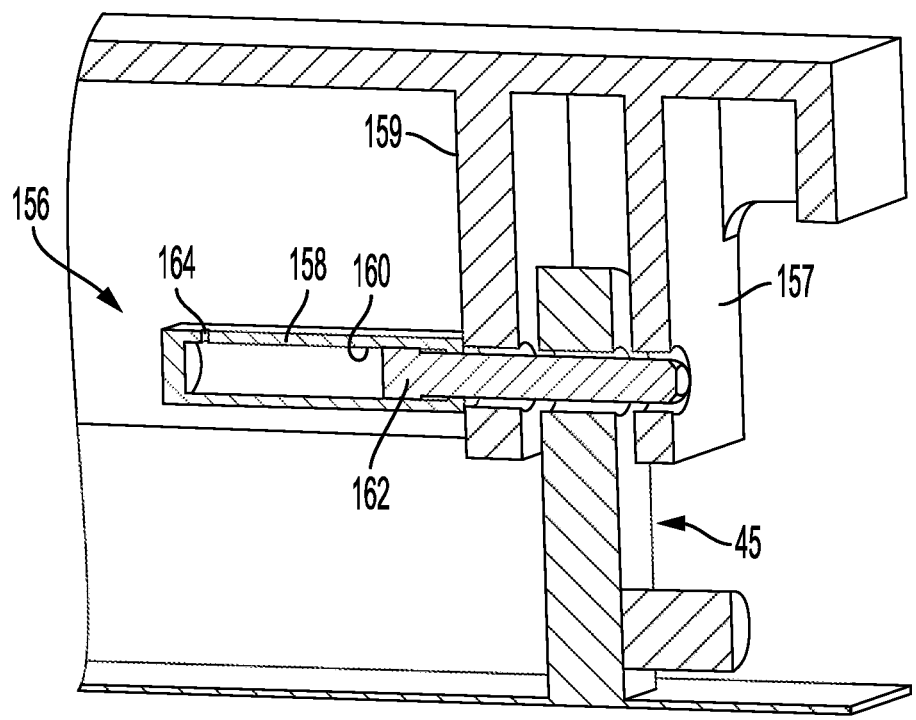
FIG. 22 shows the first inboard latch pin assembly with the latch pin in an extended position.
Figure 23:
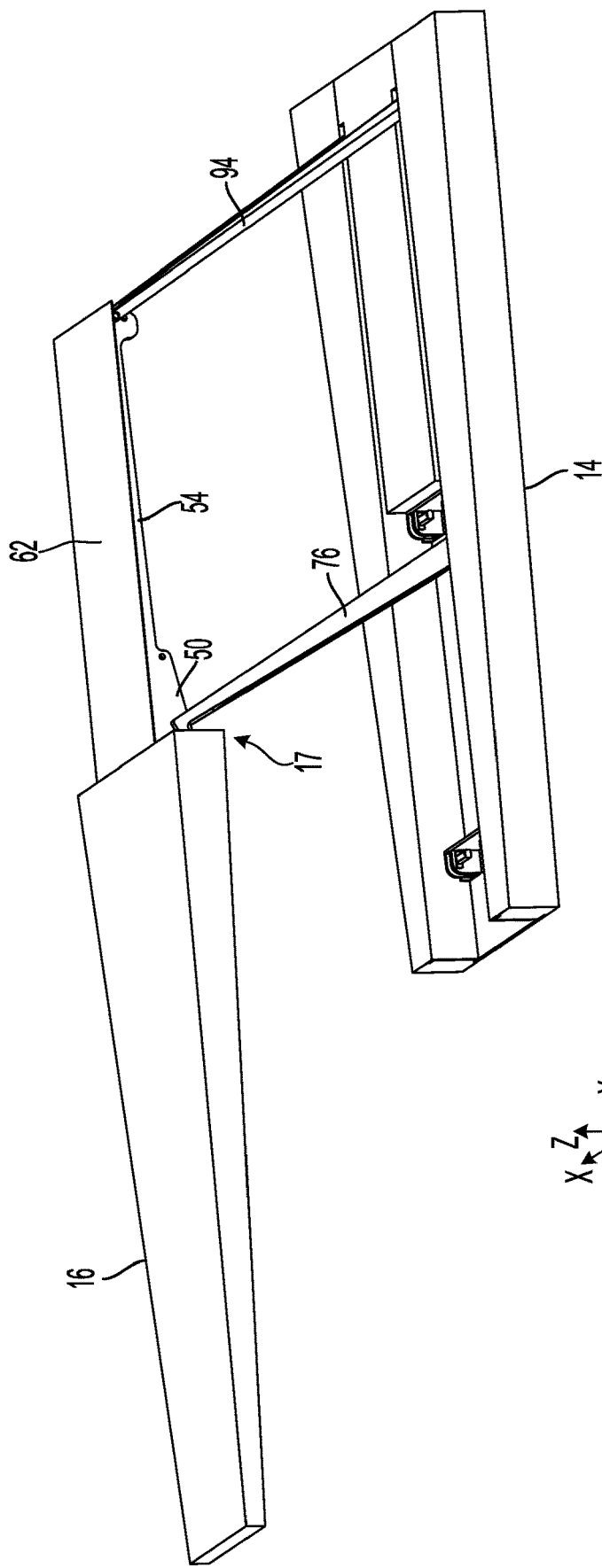
FIG. 23 shows another embodiment in which the apparatus is configured to move the wingtip over the fixed wing.

With reference now to FIGS. 6, 21, and 22, the apparatus 30 also includes a first inboard latch pin assembly 156 affixed to the inboard rib 39 and configured to extend a first inboard latch pin 162 through a first inboard aperture 46 defined in the inboard end 45 of the first arm 44 of the first bracket 40 to releasably lock the starboard wingtip 16 in the extended position. With reference to FIGS. 21 and 22, when the starboard wingtip 16 is in the extended position, an upper portion of the inboard end 45 of the first arm 44 extends between a first projecting member 157 of the inboard rib 39 and a second projecting member 159 of the inboard rib. In this configuration, the first inboard latch pin 162 is configured to move through a second member aperture 161 of the second projecting member 159, the first inboard aperture 46 of the first arm 44, and a first member aperture 163 of the first projecting member 157.

A housing 158 of the first inboard latch pin assembly 156 includes a bore 160 in which the first inboard latch pin 162 is moveably retained. An intake/exhaust port 152 defined in the housing 158 is fluidically coupled to a pressurized fluid source (not shown) to selectively extend and retract the first inboard latch pin 162. FIG. 22 shows the first inboard latch pin 162 in the actuated position that locks the first bracket 40 and attached starboard wingtip 16 in the extended position via the inboard rib 39.

With reference now to FIGS. 6, 17, and 18, the apparatus 30 also includes a second inboard latch pin assembly 168 that is similarly configured to extend a latch pin through a second inboard aperture 56 (see FIGS. 8 and 10) defined in an inboard end 55 of the second arm 54 of the second bracket 50 to lock the starboard wingtip 16 in the extended position.

Additionally, with reference to FIGS. 3, 7, and 9 the first inboard link 86 comprises a first flexible flap 100 extending from the first inboard link and configured to at least partially cover a first slot 110 defined in a bottom surface of the starboard fixed wing 14 when the starboard wingtip 16 is in the extended position. Similarly, the second inboard link 94 comprises a second flexible flap 104 extending from the second inboard link and configured to at least partially cover a second slot 112 defined in the bottom surface of the starboard fixed wing 14 when the starboard wingtip 16 is in the extended position. Advantageously, when the starboard wingtip 16 is in the extended position, the first slot 110 and second slot 112 of this configuration enable the first inboard link 86 and second inboard link 94 to be stowed within the starboard fixed wing 14 during flight, thereby providing a smooth aerodynamic profile of the starboard fixed wing. Further, providing the first flexible flap 100 and second flexible flap 104 to at least partially cover the first slot 110 and second slot 112, respectively, further enhances the aerodynamic profile of the fixed wing.

As noted above, the port fixed wing 22 and port wingtip 26 utilize the same mechanisms and components for moving the port wingtip 26 under the port fixed wing as described above for the starboard wingtip 16 and starboard fixed wing 14. Also as noted above, and with reference to FIGS. 23-25, in other configurations the apparatus 30 is configured to move the starboard wingtip 16 between the extended position and a stowed position above the fixed wing.

FIG. 26 is a flowchart of an example method 200 of shortening a wingspan of an aircraft. The following description of method 200 is provided with reference to the components described herein and shown in FIGS. 1-22. In other examples, the method 200 is performed in other contexts using other suitable components.

At 204, the method 200 includes providing an apparatus configured to move a wingtip under a fixed wing of the aircraft, the apparatus comprising: a first bracket and a second bracket extending from the wingtip of the aircraft: a motor coupled to a fixed wing of the aircraft: a first outboard link rotatably coupled to the first bracket and to the motor; a second outboard link rotatably coupled to the second bracket and to the motor: a first inboard link rotatably coupled to the first bracket and to the fixed wing: and a second inboard link rotatably coupled to the second bracket and to the fixed wing. At 208 the method 200 includes positioning the wingtip at an outboard end of the fixed wing. At 212 the method 200 includes moving the wingtip under the fixed wing by rotating the first outboard link and the second outboard link about a motor axis.

The concepts described herein are broadly applicable to any suitable type of aircraft, including conventional take-off & landing aircraft, short take-off & landing aircraft, short take-off & vertical landing aircraft, vertical take-off and landing aircraft, and manned and unmanned aircraft.

The present disclosure includes all novel and non-obvious combinations and sub-combinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

Further, the disclosure comprises configurations according to the following clauses.

Clause 1. An apparatus for shortening a wingspan of an aircraft, the apparatus comprising: a first bracket and a second bracket extending from a wingtip of the aircraft: a motor coupled to a fixed wing of the aircraft; a first outboard link rotatably coupled to the first bracket and to the motor: a second outboard link rotatably coupled to the second bracket and to the motor; a first inboard link rotatably coupled to the first bracket and to the fixed wing: and a second inboard link rotatably coupled to the second bracket and to the fixed wing, wherein the motor is configured to rotate the first outboard link and the second outboard link to move the wingtip between an extended position and a stowed position.

Clause 2. The apparatus of clause 1, wherein the motor is coupled to a first spar and a second spar of the fixed wing.

Clause 3. The apparatus of clause 1, wherein the first inboard link is rotatably coupled to a first spar of the fixed wing, and the second inboard link is rotatably coupled to a second spar of the fixed wing.

Clause 4. The apparatus of clause 1, further comprising a plurality of stiffener members extending between the first outboard link and the second outboard link.

Clause 5. The apparatus of clause 1, further comprising an outboard rib extending between a first spar and a second spar of the fixed wing: and a first outboard latch pin assembly affixed to the outboard rib and configured to extend a first outboard latch pin through a first outboard aperture defined in an attachment end of the first bracket to lock the wingtip in the extended position.

Clause 6. The apparatus of clause 5, further comprising an inboard rib extending between the first spar and the second spar of the fixed wing: and a first inboard latch pin assembly configured to extend a first inboard latch pin through a first inboard aperture defined in an inboard end of a first arm of the first bracket to lock the wingtip in the extended position.

Clause 7. The apparatus of clause 6, further comprising: a second outboard latch pin assembly configured to extend a second outboard latch pin through a second outboard aperture defined in an attachment end of the second bracket to lock the wingtip in the extended position; and a second inboard latch pin assembly configured to extend a second inboard latch pin through a second inboard aperture defined in an inboard end of a second arm of the second bracket to lock the wingtip in the extended position.

Clause 8. The apparatus of clause 6, wherein the first inboard link is rotatably coupled to the inboard end of the first arm of the first bracket.

Clause 9. The apparatus of clause 1, further comprising a flexible panel extending from an inboard end of the wingtip toward a fuselage of the aircraft, wherein the first bracket and the second bracket are affixed to the flexible panel.

Clause 10. The apparatus of clause 1, wherein the first inboard link comprises a flexible flap extending from the first inboard link and configured to at least partially cover a first slot defined in a bottom surface of the fixed wing when the wingtip is in the extended position.

Clause 11. The apparatus of clause 1, wherein the first outboard link, the second outboard link, the first inboard link, and the second inboard link remain parallel to one another as the wingtip moves between the extended position and the stowed position.

Clause 12. An aircraft, comprising: a fixed wing extending from a fuselage: a wingtip moveably coupled to an outboard end of the fixed wing: and an apparatus for moving the wingtip under the fixed wing, the apparatus comprising: a first bracket and a second bracket extending from a wingtip of the aircraft: a motor coupled to a fixed wing of the aircraft: a first outboard link rotatably coupled to the first bracket and to the motor; a second outboard link rotatably coupled to the second bracket and to the motor: a first inboard link rotatably coupled to the first bracket and to the fixed wing: and a second inboard link rotatably coupled to the second bracket and to the fixed wing.

Clause 13. The aircraft of clause 12, wherein the motor is coupled to a first spar and a second spar of the fixed wing.

Clause 14. The aircraft of clause 12, wherein the first inboard link is rotatably coupled to a first spar of the fixed wing, and the second inboard link is rotatably coupled to a second spar of the fixed wing.

Clause 15. The aircraft of clause 12, further comprising a plurality of stiffener members extending between the first outboard link and the second outboard link.

Clause 16. The aircraft of clause 12, further comprising: an outboard rib extending between a first spar and a second spar of the fixed wing: and a first outboard latch pin assembly configured to extend a first outboard latch pin through a first outboard aperture defined in an attachment end of the first bracket to lock the wingtip in the extended position.

Clause 17. The aircraft of clause 16, further comprising: an inboard rib extending between the first spar and the second spar of the fixed wing: and a first inboard latch pin assembly configured to extend a first inboard latch pin through a first inboard aperture defined in an inboard end of a first arm of the first bracket to lock the wingtip in the extended position.

Clause 18. The aircraft of clause 17, further comprising: a second outboard latch pin assembly configured to extend a second outboard latch pin through a second outboard aperture defined in an attachment end of the second bracket to lock the wingtip in the extended position; and a second inboard latch pin assembly configured to extend a second inboard latch pin through a second inboard aperture defined in an inboard end of a second arm of the second bracket to lock the wingtip in the extended position.

Clause 19. The aircraft of clause 12, further comprising a flexible panel extending from an inboard end of the wingtip, wherein the first bracket and the second bracket are affixed to the flexible panel.

Clause 20. A method of shortening a wingspan of an aircraft, the method comprising: providing an apparatus for moving a wingtip under a fixed wing of the aircraft, the apparatus comprising: a first bracket and a second bracket extending from the wingtip of the aircraft: a motor coupled to a fixed wing of the aircraft; a first outboard link rotatably coupled to the first bracket and to the motor: a second outboard link rotatably coupled to the second bracket and to the motor, a first inboard link rotatably coupled to the first bracket and to the fixed wing; and a second inboard link rotatably coupled to the second bracket and to the fixed wing; positioning the wingtip at an outboard end of the fixed wing; and moving the wingtip under the fixed wing by rotating the first outboard link and the second outboard link about a motor axis of the motor.

The invention claimed is:

1. An apparatus for shortening a wingspan of an aircraft, the apparatus comprising:
   a first bracket and a second bracket extending from a wingtip of the aircraft;
   a motor coupled to a fixed wing of the aircraft;
   a first outboard link rotatably coupled to the first bracket and to the motor;
   a second outboard link rotatably coupled to the second bracket and to the motor;
   a first inboard link rotatably coupled to the first bracket and to the fixed wing; and
   a second inboard link rotatably coupled to the second bracket and to the fixed wing,
   wherein the motor is configured to rotate the first outboard link and the second outboard link to move the wingtip between an extended position and a stowed position.

2. The apparatus of claim 1, wherein the motor is coupled to a first spar and a second spar of the fixed wing.

3. The apparatus of claim 1, wherein the first inboard link is rotatably coupled to a first spar of the fixed wing, and the second inboard link is rotatably coupled to a second spar of the fixed wing.

4. The apparatus of claim 1, further comprising a plurality of stiffener members extending between the first outboard link and the second outboard link.

5. The apparatus of claim 1, further comprising:
   an outboard rib extending between a first spar and a second spar of the fixed wing; and
   a first outboard latch pin assembly affixed to the outboard rib and configured to extend a first outboard latch pin through a first outboard aperture defined in an attachment end of the first bracket to lock the wingtip in the extended position.

6. The apparatus of claim 5, further comprising:
   an inboard rib extending between the first spar and the second spar of the fixed wing; and
   a first inboard latch pin assembly configured to extend a first inboard latch pin through a first inboard aperture defined in an inboard end of a first arm of the first bracket to lock the wingtip in the extended position.

7. The apparatus of claim 6, further comprising:
   a second outboard latch pin assembly configured to extend a second outboard latch pin through a second outboard aperture defined in an attachment end of the second bracket to lock the wingtip in the extended position; and
   a second inboard latch pin assembly configured to extend a second inboard latch pin through a second inboard aperture defined in an inboard end of a second arm of the second bracket to lock the wingtip in the extended position.

8. The apparatus of claim 6, wherein the first inboard link is rotatably coupled to the inboard end of the first arm of the first bracket.

9. The apparatus of claim 1, further comprising a flexible panel extending from an inboard end of the wingtip toward a fuselage of the aircraft, wherein the first bracket and the second bracket are affixed to the flexible panel.

10. The apparatus of claim 1, wherein the first inboard link comprises a flexible flap extending from the first inboard link and configured to at least partially cover a first slot defined in a bottom surface of the fixed wing when the wingtip is in the extended position.

11. The apparatus of claim 1, wherein the first outboard link, the second outboard link, the first inboard link, and the second inboard link remain parallel to one another as the wingtip moves between the extended position and the stowed position.

12. An aircraft, comprising:
    a fixed wing extending from a fuselage;
    a wingtip moveably coupled to an outboard end of the fixed wing; and
    an apparatus for moving the wingtip under the fixed wing, the apparatus comprising:
       a first bracket and a second bracket extending from a wingtip of the aircraft;
       a motor coupled to a fixed wing of the aircraft;
       a first outboard link rotatably coupled to the first bracket and to the motor;
       a second outboard link rotatably coupled to the second bracket and to the motor;
       a first inboard link rotatably coupled to the first bracket and to the fixed wing; and
       a second inboard link rotatably coupled to the second bracket and to the fixed wing,
       wherein the motor is configured to rotate the first outboard link and the second outboard link to move the wingtip between an extended position and a stowed position.

13. The aircraft of claim 12, wherein the motor is coupled to a first spar and a second spar of the fixed wing.

14. The aircraft of claim 12, wherein the first inboard link is rotatably coupled to a first spar of the fixed wing, and the second inboard link is rotatably coupled to a second spar of the fixed wing.

15. The aircraft of claim 12, further comprising a plurality of stiffener members extending between the first outboard link and the second outboard link.

16. The aircraft of claim 12, further comprising:
    an outboard rib extending between a first spar and a second spar of the fixed wing; and
    a first outboard latch pin assembly configured to extend a first outboard latch pin through a first outboard aperture defined in an attachment end of the first bracket to lock the wingtip in the extended position.

17. The aircraft of claim 16, further comprising:
    an inboard rib extending between the first spar and the second spar of the fixed wing; and
    a first inboard latch pin assembly configured to extend a first inboard latch pin through a first inboard aperture defined in an inboard end of a first arm of the first bracket to lock the wingtip in the extended position.

18. The aircraft of claim 17, further comprising:
    a second outboard latch pin assembly configured to extend a second outboard latch pin through a second outboard aperture defined in an attachment end of the second bracket to lock the wingtip in the extended position; and
    a second inboard latch pin assembly configured to extend a second inboard latch pin through a second inboard aperture defined in an inboard end of a second arm of the second bracket to lock the wingtip in the extended position.

19. The aircraft of claim 12, further comprising a flexible panel extending from an inboard end of the wingtip, wherein the first bracket and the second bracket are affixed to the flexible panel.

20. A method of shortening a wingspan of an aircraft, the method comprising:

providing an apparatus for moving a wingtip under a fixed wing of the aircraft, the apparatus comprising:
a first bracket and a second bracket extending from the wingtip of the aircraft;
a motor coupled to a fixed wing of the aircraft;
a first outboard link rotatably coupled to the first bracket and to the motor;
a second outboard link rotatably coupled to the second bracket and to the motor;
a first inboard link rotatably coupled to the first bracket and to the fixed wing; and
a second inboard link rotatably coupled to the second bracket and to the fixed wing,
positioning the wingtip at an outboard end of the fixed wing; and
moving the wingtip under the fixed wing by rotating the first outboard link and the second outboard link about a motor axis of the motor.

* * * * *